(12) United States Patent
Wolf-Monheim

(10) Patent No.: US 8,985,595 B2
(45) Date of Patent: Mar. 24, 2015

(54) INDIVIDUAL WHEEL SUSPENSION WITH AUTOMATIC CAMBER ADAPTATION

(75) Inventor: Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/532,090

(22) Filed: Jun. 25, 2012

(65) Prior Publication Data
US 2013/0020772 A1   Jan. 24, 2013

(30) Foreign Application Priority Data
Jun. 29, 2011 (DE) .......................... 10 2011 078 262

(51) Int. Cl.
*B62D 17/00* (2006.01)
*B60G 3/26* (2006.01)
*B60G 21/073* (2006.01)
*B60G 3/20* (2006.01)
(Continued)

(52) U.S. Cl.
CPC .......... *B60G 3/20* (2013.01); *B60G 2204/8304* (2013.01); *B60G 3/26* (2013.01); *B62D 17/00* (2013.01); *B60G 17/0162* (2013.01); *B60G 17/021* (2013.01); *B60G 2200/144* (2013.01); *B60G 2200/46* (2013.01); *B60G 2204/423* (2013.01)
USPC ............. 280/5.521; 280/86.751; 280/124.162

(58) Field of Classification Search
CPC ............ B60G 3/26; B60G 3/06; B60G 3/265; B60G 11/58; B60G 11/56; B60G 21/00; B60G 21/026; B60G 21/073; B60G 3/00; B60G 17/015; B60G 15/063; B60G 15/00; B60G 13/006; B60G 2200/46; B60G 2400/0511; B60G 2400/05142; B60G 2400/95; B60G 2204/8304; B60G 2204/82; B60G 21/007; B62D 17/00
USPC ........ 280/5.521, 5.52, 5.509, 86.751, 86.757, 280/124.103, 124.157, 124.162
See application file for complete search history.

(56) References Cited

U.S. PATENT DOCUMENTS

| 2,606,506 | A | * | 8/1952 | Sloane | .......................... 105/164 |
| 2,678,830 | A |   | 5/1954 | Cigan et al. | |
| 3,287,025 | A | * | 11/1966 | Garcea et al. | .............. 280/6.159 |

(Continued)

FOREIGN PATENT DOCUMENTS

| DE | 27 26 097 A1 | 12/1978 | ............. B60G 17/02 |
| DE | 41 12 736 A1 | 10/1991 | ........... B60G 21/073 |

(Continued)

*Primary Examiner* — Keith Frisby
(74) *Attorney, Agent, or Firm* — L.C. Begin & Associates, PLLC

(57) ABSTRACT

The invention relates to a wheel suspension for vehicles, with a vehicle body and wheels articulated on the vehicle body by means of wheel suspension parts. The wheel suspension parts of each wheel oscillate during the driving mode, and contain a wheel carrier supporting the wheel rotatably about a wheel axle and links connecting said wheel carrier to the vehicle body. The relative movement between the vehicle body and wheel suspension parts can be detected by means of detecting means. Articulation positions of the same and/or other wheel suspension parts can be automatically changed by at least one actuating means depending on the relative movements detected by the detecting means. At least one first and at least one second detecting means are respectively assigned to first and second vehicle sides of a vehicle axle.

13 Claims, 1 Drawing Sheet

(51) Int. Cl.
*B60G 17/016* (2006.01)
*B60G 17/02* (2006.01)

(56) References Cited

U.S. PATENT DOCUMENTS

| | | | | |
|---|---|---|---|---|
| 3,524,657 A | * | 8/1970 | Yew et al. | 280/6.157 |
| 3,598,422 A | * | 8/1971 | Strauff | 280/124.162 |
| 4,154,461 A | * | 5/1979 | Schnittger | 280/5.508 |
| 4,350,354 A | * | 9/1982 | Dotti et al. | 280/6.159 |
| 4,364,582 A | * | 12/1982 | Takahashi et al. | 280/124.155 |
| 4,371,191 A | * | 2/1983 | Goldberg et al. | 280/5.501 |
| 4,546,997 A | * | 10/1985 | Smyers | 280/5.509 |
| 4,700,972 A | * | 10/1987 | Young | 280/5.521 |
| 4,997,201 A | * | 3/1991 | Schaible | 280/124.145 |
| 5,089,966 A | * | 2/1992 | Fukushima et al. | 701/38 |
| 5,094,472 A | * | 3/1992 | Oyama et al. | 280/86.751 |
| 5,215,327 A | * | 6/1993 | Gatter et al. | 280/5.515 |
| 5,324,056 A | * | 6/1994 | Orton | 280/124.106 |
| 5,560,637 A | * | 10/1996 | Lee | 280/5.521 |
| 5,580,089 A | * | 12/1996 | Kolka | 280/124.103 |
| 5,620,199 A | * | 4/1997 | Lee | 280/5.521 |
| 5,700,025 A | * | 12/1997 | Lee | 280/86.751 |
| 6,036,206 A | * | 3/2000 | Bastin et al. | 280/124.1 |
| 6,250,658 B1 | * | 6/2001 | Sakai | 280/124.106 |
| 6,267,387 B1 | * | 7/2001 | Weiss | 280/5.52 |
| 6,637,758 B2 | * | 10/2003 | Woo | 280/5.521 |
| 7,163,208 B2 | * | 1/2007 | Brandenburger | 280/6.159 |
| 7,392,978 B2 | * | 7/2008 | Carlitz et al. | 267/221 |
| 7,637,516 B2 | * | 12/2009 | Mizuno et al. | 280/124.157 |
| 7,717,438 B2 | * | 5/2010 | Koch et al. | 280/5.508 |
| 8,128,110 B2 | * | 3/2012 | Sacli | 280/124.106 |
| 8,226,090 B2 | * | 7/2012 | Hammelmaier et al. | 280/5.52 |
| 2003/0111812 A1 | * | 6/2003 | Carlstedt et al. | 280/124.16 |
| 2006/0103102 A1 | * | 5/2006 | Mullican | 280/124.162 |
| 2007/0132198 A1 | * | 6/2007 | Lee | 280/5.521 |

FOREIGN PATENT DOCUMENTS

| | | | | |
|---|---|---|---|---|
| DE | 10 2009 042 576 A1 | 3/2011 | | B62D 17/00 |
| FR | 2671764 A1 | * 7/1992 | | B60G 21/02 |

* cited by examiner

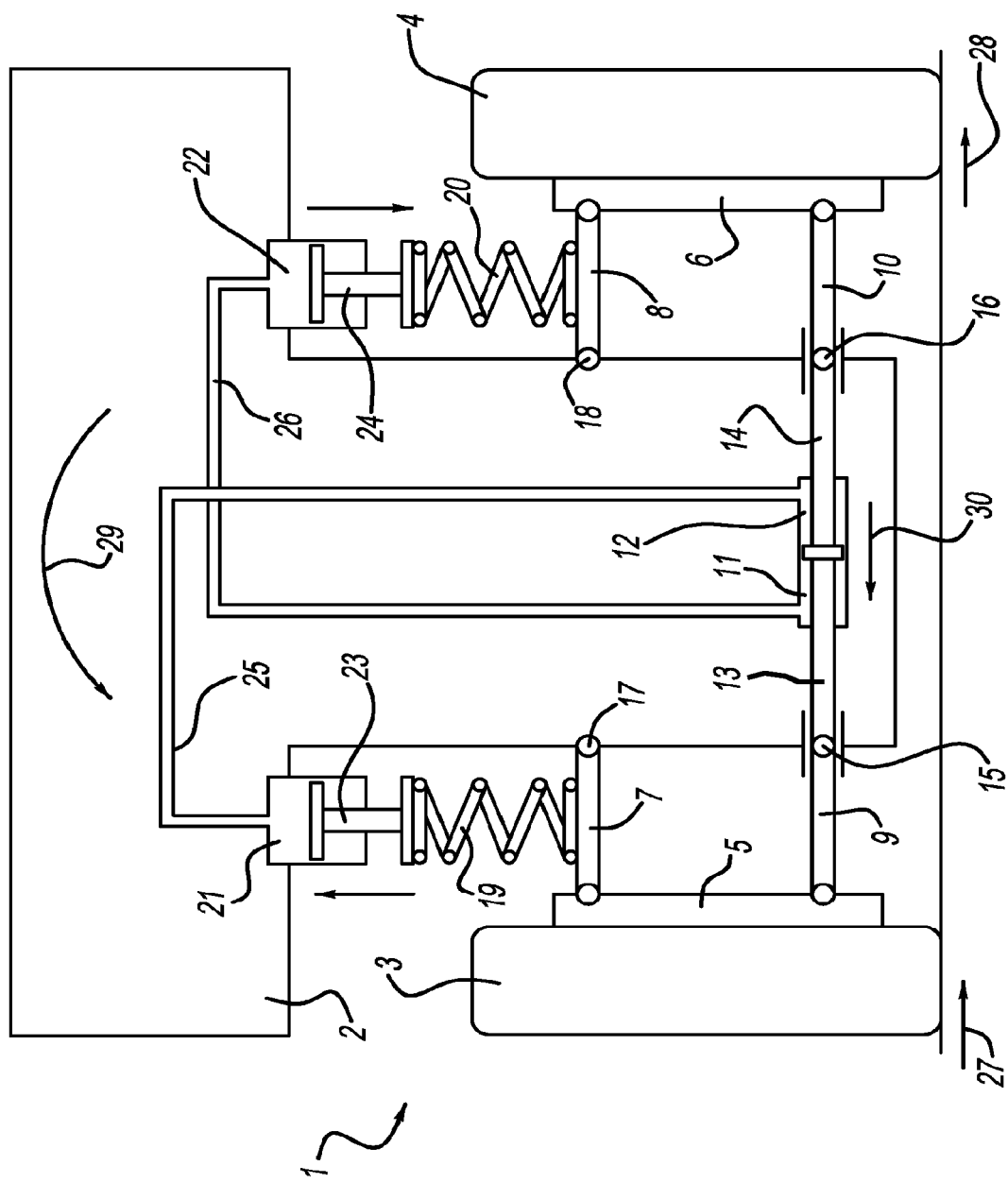

INDIVIDUAL WHEEL SUSPENSION WITH AUTOMATIC CAMBER ADAPTATION

The present invention relates to a wheel suspension for vehicles according to the preamble of claim 1.

In vehicles with individual wheel suspension, a change in the chassis geometry during cornering (rolling movement of the vehicle frame or vehicle body) and during compression and rebound (upward and downward movement of the vehicle frame or vehicle body) cannot be avoided.

In this case, the camber angle during cornering is particularly disadvantageously effected. Unfavorable camber angles cause a deterioration in the vehicle handling performance, that is to say, given an optimum camber setting for straight-ahead travel, the handling performance suffers because of the abovementioned change in geometry, for example when cornering, since the maximum possible tire contact surface or cornering force is not achieved.

The strategy for selecting the optimum camber angle for different tires can vary depending on the type of vehicle. For example, one possible strategy attempts to maximize the tire contact surface under all driving conditions in order thereby also to maximize the lateral and longitudinal forces which can be transmitted by the tire. That is to say, in this case, the camber angle would be set and kept approximately at zero degrees or around zero degrees under all driving conditions. This enables an overall considerable improvement in the performance of a vehicle in respect of acceleration, braking, cornering ability and the handling of the vehicle quite generally.

In particular during cornering, the camber angles of the wheels of a vehicle may disadvantageously change considerably due to a vertical movement of the wheel in combination with a rolling movement of the vehicle body.

According to the prior art, a number of attempts have already been undertaken to remove the influence of the rolling movement of the vehicle body on the camber.

For example, DE 196 37 159 A1 discloses a wheel suspension with automatic camber adaptation to wheel carriers which move in an opposed manner to the vehicle body during cornering and automatically adjust the camber on the basis of the forces acting on the vehicle during cornering. For this purpose, two double-action hydraulic cylinders for detecting the rolling movement of the vehicle body are assigned to the right and left wheel of a vehicle axle. The hydraulic cylinders are arranged in such a manner that they are operatively connected to the vehicle body and to in each case one of the wheel suspension parts moving in an opposite direction during cornering. Furthermore, the cylinder spaces which become smaller during a rolling movement of the vehicle body and the cylinder spaces which are enlarged in the process each communicate with one another. According to one variant embodiment, a double-action hydraulic cylinder which is operatively connected to the vehicle body and the respective wheel carrier, is likewise provided as an actuating means for changing the camber angle of the wheels of the vehicle axle. Furthermore, the cylinder spaces of said hydraulic cylinder are connected to one of the communicating cylinder spaces of the receiving hydraulic cylinders.

Furthermore, DE 41 13 736 A1 discloses a stabilizing device for vehicles, with which an active control of the rolling rigidity can be carried out without the driving comfort of the vehicle being impaired. A hydraulic cylinder with an upper and a lower cylinder chamber is arranged in each case between a vehicle body and the respective wheel suspension parts of a right and left vehicle side, wherein the upper and lower cylinder chambers of the two cylinders are connected to one another crosswise via two fluid lines. The fluid pressure can be controlled depending on the driving state of the vehicle via a further hydraulic cylinder, which is actuated by an electric motor, and an electronic unit activating the electric motor.

Furthermore, EP 2 018 983 A2 describes a chassis system for a motor vehicle, with a rolling stabilization device and with a wheel camber adjustment device, wherein the rolling stabilization device and the wheel camber adjustment device have one or more hydraulic actuating devices. The rolling stabilization device and the wheel camber adjustment device are coupled to each other by means of a common hydraulic system. An active camber adjustment is realized by the hydraulic power supply and the rolling stabilization valves being used. The desired pressure of the hydraulic device is determined depending on vehicle states, for example measured or calculated variables of the transverse acceleration, the steering wheel angle, the vehicle speed and the rolling angle.

Finally, DE 27 26 097 discloses a hydraulically controled rear axle for motor vehicles, in which the distance of the body-side articulation bearings of longitudinal links from the carriageway is automatically changed depending on a loading state of the vehicle, in particular is lowered under full load and is raised under an empty load. By this means, the rolling center is lowered under full load, which, during cornering, leads to a countersteering of the rear axle or to a reduction in the slip angle of the rear axle.

Against this background, it is the object of the present invention to provide at least one alternative individual wheel suspension to the prior art, with which the influence of the rolling movement of a vehicle body on the camber of the wheels can be eliminated or at least reduced. In addition, the intention is for the design of the individual wheel suspension to be as simple as possible for easy adjustability. Furthermore, a reduction in the number of components is to be sought, in order to be able to obtain savings on space and weight and also to realize a cost-effective production.

This object is achieved by an individual wheel suspension with the features of claim 1. Further particularly advantageous refinements of the invention are disclosed in the dependent claims.

It should be pointed out that the features cited individually in the description below can be combined with one another in any technically expedient manner and indicate further refinements of the invention. The description additionally characterizes and specifies the invention in particular in conjunction with FIG. 1.

According to the invention, an individual wheel suspension for vehicles, in particular motor vehicles, comprises a vehicle body and wheels articulated on the vehicle body by means of wheel suspension parts. The wheel suspension parts of each wheel, which wheel suspension parts oscillate during the driving mode, comprise a wheel carrier supporting the wheel rotatably about a wheel axle and links connecting said wheel carrier to the vehicle body. Furthermore, there are detecting means with which the relative movement between the vehicle body and wheel suspension parts can be detected, and at least one actuating means, with which articulation positions of the same and/or other wheel suspension parts can be automatically changed depending on the relative movements detected by the detecting means. Furthermore, at least one first detecting means is assigned to a first vehicle side of a vehicle axle and at least one second detecting means is assigned to a second vehicle side of the same vehicle axle, wherein the detecting means are directly operatively connected exclusively to the actuating means. That is to say, the detecting means are not connected to one another or are interconnected in a direct, force-transmitting connection in addition to the direct operative connection provided to the actuating means, for example by means of a parallel operative connection. However, an indirect, for example serial connection for example via the actuating means, is covered by the present invention.

First of all, the wheel suspension according to the present invention makes it possible to eliminate or at least to reduce the effect of the rolling movement of the vehicle body on the camber of the wheels by the actuating means automatically carrying out 20a wheel camber adaptation by changing the articulation positions of certain wheel suspension parts depending on the relative movement, which is detected by the detecting means of the same and/or other wheel suspension parts with respect to the vehicle body. However, the individual wheel suspension according to the invention furthermore also brings about a very substantial reduction in the operative connections, i.e. the force transmission paths, between the individual components of the wheel suspension, and therefore leads to a considerable simplification of the possible interrelationships of the wheel suspension components. By this means, the design of the wheel suspension according to the invention can be substantially simplified, and particularly simple adjustability, in particular in respect of the automatic wheel camber adaptation, can be achieved.

According to an advantageous refinement of the invention, only one actuating means is provided for changing the articulation positions of the wheel suspension parts of the first and second vehicle sides of the same vehicle axle. In this case, the actuating means is connected to a wheel suspension part of the first vehicle side and to a corresponding wheel suspension part of the second vehicle side and also fixedly to the vehicle body. With just one actuating means, a simultaneous camber adaptation of the wheels, which are connected to the wheel suspension according to the invention, of both vehicle sides can therefore be carried out by changing the respective articulation points of the wheel suspension parts connected to the actuating means. By this means, the required components of the wheel suspension according to the invention are further reduced, thus enabling space, weight and cost savings to be advantageously obtained.

According to a further advantageous refinement of the invention, the detecting means are each designed as single-action, hydraulic piston-cylinder arrangements, also referred to herein as rolling cylinders, each having a cylinder working space, and the actuating means is designed as a double-action, hydraulic piston-cylinder arrangement, also referred to hereinbelow as a camber cylinder, having two cylinder working spaces sealed off from each other by a piston, the first cylinder working space of the actuating means being assigned to a wheel suspension part of the first vehicle side and the second cylinder working space of the actuating means being assigned to a wheel suspension part of the second vehicle side of the same vehicle axle. Furthermore, in this refinement, the cylinder working space of the first detecting means is connected in a fluid-conducting manner to the second cylinder working space of the actuating means, and the cylinder working space of the second detecting means is connected in a fluid-conducting manner to the first cylinder working space of the actuating means. By means of the rolling and camber cylinders designed as hydraulic piston-cylinder arrangements, the wheel suspension according to the invention is capable, by means of the camber cylinder, of passively carrying out an automatic dynamic camber adaptation depending on the relative movements, which are detected by the rolling cylinders, between the wheel suspension parts and the vehicle body. In other words, the energy required by the camber cylinder for adjusting the camber is supplied solely by the rolling movement of the vehicle body. Furthermore, the extent of the rolling movement of the vehicle body also determines the extent of the wheel camber adjustment, and therefore the latter is automatically adapted to the actual dynamic handling performance of the vehicle. Accordingly, an optimum camber adjustment is always ensured by means of the individual wheel suspension according to the invention. Furthermore, the hydraulic piston-cylinder arrangements permit a simple configuration of the wheel suspension according to the invention in respect of the force transmission, for example by determining the active piston surfaces or piston surface ratios of the piston-cylinder arrangements and the cross sections of the hydraulic lines connecting the piston-cylinder arrangements to one another. Depending on requirements, the cross sections can also be expediently predefined by the use of corresponding flow restrictors in the hydraulic lines.

In a further advantageous refinement of the invention, the detecting means are connected to the wheel suspension parts and the vehicle body, and an elastic spring element, for example a helical spring, is arranged in each case between the detecting means and the wheel suspension parts. By means of rolling movements of the vehicle body, the spring element is compressed or extended depending on the orientation of the rolling movement toward one or the other vehicle side. This change in length of the spring element causes a change in the force with which said spring element acts on the detecting means or the rolling cylinder, and therefore, upon compression of the spring element, in the cylinder working space an increasing force, which compresses the cylinder working volume, is exerted on the hydraulic fluid and, upon extension of the spring element, a decreasing force, which expands the cylinder working volume, is exerted on the hydraulic fluid in the cylinder working space. Said forces attempt to be equalized via the camber cylinder, which is connected in a fluid-conducting manner to the rolling cylinders, and the second rolling cylinder, which is connected in turn to the camber cylinder, which leads to a longitudinal displacement of the respective rolling cylinder pistons.

Owing to the existing equilibrium of forces, forces which are exerted in the same amount and in the same direction both on the spring element assigned to the first vehicle side and on the spring element assigned to the second vehicle side do not cause any displacement whatsoever of the respective pistons of the rolling cylinders. In other words, owing to the incompressibility of the hydraulic fluid, identical force components on both vehicle sides are essentially entirely absorbed and cushioned by the spring elements whereas unidentical force components on both vehicle side are transmitted by the springs to the hydraulic fluid in the rolling cylinders, and the hydraulic fluid can then be used to carry out work, in particular for camber adaptation by means of the camber cylinder.

The spring element additionally permits the vehicle body to be generally supported in relation to the wheel suspension parts, and therefore a spring element of an additionally present suspension strut, which customarily has a spring element and a shock absorber, can be of smaller dimensions or can even be entirely omitted. In addition, the supporting force of the vehicle body in relation to the wheel suspension parts advantageously places the hydraulic fluid under pressure, and therefore the hydraulic fluid does not additionally have to be placed under pressure, for example, by means of a pump or a pressure accumulator, and therefore, in turn, the number of components of the wheel suspension according to the invention can be reduced and the design as a whole can be simplified. In addition, the spring elements permit simple adjustment of the wheel suspension according to the invention by simple determination of force path parameters or of the spring constant of the spring element.

Further advantageous details and effects of the invention are explained in more detail below with reference to an exemplary embodiment which is illustrated in the single FIGURE, in which:

FIG. 1 shows a schematic view of a wheel suspension according to the invention of a vehicle, seen from behind.

FIG. 1 illustrates a schematic view of a wheel suspension 1 according to the invention of a vehicle, in particular a motor vehicle, seen from behind. For the sake of clarity, the illustration of further spring and/or damper elements, for example suspension struts, has been omitted, since said elements are known to a person skilled in the art from the prior art and are not of primary relevance to the invention. Furthermore, in the illustration of FIG. 1, the left vehicle side corresponds to a first vehicle side and the right vehicle side corresponds to a second vehicle side.

The vehicle which is illustrated in FIG. 1 comprises a vehicle body 2 and left and right wheels or wheel rim arrangements 3 and 4, which are respectively coupled to the vehicle body 2 via a left and right wheel carrier 5 and 6 and a left and right upper transverse link 7 and 8 and a left and right lower transverse link 9 and 10. In particular, the left and right transverse links 9 and 10 are connected on the vehicle side to an actuating means 11 which is designed as a hydraulic, double-action piston-cylinder arrangement, and is also referred to herein as a camber cylinder. The cylinder housing 12 of the camber cylinder 11 is fixedly connected to the vehicle body 2. The piston rods 13 and 14 which are longitudinally displaceable in the cylinder housing 12 are connected in an articulated manner to the lower transverse links 9 and 10 in respective articulation points 15 and 16.

As indicated in FIG. 1 in each case by means of two lines illustrated in parallel at the articulation points 15 and 16, the articulation points 15 and 16 can be displaced laterally to the left vehicle side and to the right vehicle side by means of the camber cylinder 11. This enables adjustment of the camber of the wheels 3 and 4, since the latter are connected to the vehicle body 2 via their respective upper transverse links 7 and 8 in the laterally essentially immovable articulation points 17 and 18.

The left and right upper transverse links 7 and 8 are respectively connected via an elastic spring element 19 and 20, for example helical springs, to a detecting means 21 and 22 designed as a single-action, hydraulic piston-cylinder arrangement and also referred to herein as a rolling cylinder. The cylinder housings of the respective rolling cylinders 21 and 22 are fixedly connected to the vehicle body 2. The piston rods 23 and 24 which are longitudinally displaceable in the respective cylinder housings are connected to the respective spring elements 19 and 20 via corresponding plate-like spring-receiving elements.

The cylinder working space, which is located at the top in FIG. 1, of the left rolling cylinder 21 or the left detecting means 21 is connected in a fluid-conducting manner via a first hydraulic line 25 to that cylinder working space of the camber cylinder 11 or actuating means 11 which is on the right, i.e. is assigned to the right vehicle side. Furthermore, the cylinder working space, which is located at the top in FIG. 1, of the right rolling cylinder 22 or detecting means 22 is connected in a fluid-conducting manner via a second hydraulic line 26 to that cylinder working space of the camber cylinder 11 or actuating means 11 which is on the left, i.e. is assigned to the left vehicle side.

The manner of operation of the individual wheel suspension 1 according to the invention is described below. During cornering of the vehicle to the right, the cornering forces 27 and 28, which are illustrated in FIG. 1, act on the wheels 3 and 4, respectively. As a consequence of the mass inertia of the vehicle body 2, the vehicle body 2 undergoes a rolling moment 29 about the longitudinal axis of the vehicle. Said rolling moment 29 leads to a rolling movement (not illustrated specifically in FIG. 1) of the vehicle body 2 to the left. By this means, the left helical spring 19 is compressed owing to the upper and lower transverse links 7 and 9 moving upward about their respective articulation points 17 and 15 relative to the vehicle body 2 while the right helical spring 20 is extended owing to the upper and lower transverse links 8 and 10 moving downward about their respective articulation points 18 and 16 relative to the vehicle body 2. Said relative movements of the transverse links 7, 8, 9 and 10 with respect to the vehicle body 2 in combination with the rolling movement 29 of the vehicle body 2 lead in a manner known per se to a change in the carriageway-related camber present at the wheels 3 and 4.

In the exemplary embodiment, which is illustrated in FIG. 1, of the individual wheel suspension 1 according to the invention, the above described compression of the left spring element 19 and the extension of the right spring element 20 lead to the cylinder working volume of the cylinder working space of the left rolling cylinder 21 being compressed while the cylinder working volume of the cylinder working space of the right rolling cylinder 22 is expanded. That is to say, the hydraulic fluid, for example hydraulic oil, is placed under higher pressure in the left rolling cylinder 21 than in the right rolling cylinder 22. By means of this pressure imbalance, the hydraulic fluid is pressed out of the cylinder working space of the left rolling cylinder 21 into the right 11 cylinder working space of the camber cylinder, whereupon the piston rods 13 and 14 of the double-action camber cylinder 11 move to the left in the direction indicated by the arrow 30, as illustrated in FIG. 1. By means of this movement of the piston rods 13 and 14, the carriageway-related camber angle both of the left and of the right wheel 3 and 4 is changed or adapted in a manner compensating for the rolling movement of the vehicle body 2.

The hydraulic fluid emerging from the left cylinder working space of the camber cylinder because of the displacement 30 passes via the second hydraulic line 26 into the cylinder working space of the right rolling cylinder 22, whereupon the latter presses the piston or the piston rod 24 downward. This operation continues until the equilibrium of forces between the two rolling cylinders 21 and 22 is restored.

The above described individual wheel suspension according to the invention is not restricted to the embodiment disclosed herein but also comprises further embodiments acting in an identical manner. The individual wheel suspension according to the invention can thus be provided on the front axle and/or the rear axle of the motor vehicle. It is easily apparent to a person skilled in the art that the invention can be applied in principle to all known individual wheel suspensions having wheel carriers which are movable in an opposed manner during cornering. Of course, the invention can similarly also be used on steerable axles.

The individual wheel suspensions include in particular suspension (damper) strut wheel suspensions, double transverse link wheel suspensions and longitudinal and tilted link axles. In all of these types of axle, chassis links are provided for the articulation of the wheels of the chassis axle, the position of which can be changed by means of the camber cylinder. Therefore, in addition to the wheel camber of the wheels, the wheel toe of the wheels can also be adjusted depending on the current driving state of the motor vehicle. It therefore also lies within the scope of the invention to carry out the adjustment of the wheel carrier by the actuating cylinders not exclusively in a vertical plane (pure camber adjustment), but rather an adjustment may also take place in a region differing from the vertical plane, up to the horizontal plane, i.e. corresponding actuating elements can also be used on the tie rods to optimize the steering geometry.

The hydraulic elements (detecting means or rolling cylinders and actuating means or camber cylinders) are merely indicated schematically in FIG. 1 with regard to the configuration and fitting thereof. It is not absolutely necessary to arrange the rolling cylinders, as illustrated, directly between the vehicle body and an oscillating part of the wheel suspension. On the contrary, the relative movement between the vehicle body and the oscillating wheel suspension parts can be initiated indirectly in the rolling cylinders, for example via impact or tension struts and deflecting levers, which opens up further advantageous design possibilities with regard to the spatial arrangement of the rolling cylinders and a possible progressivity, degressivity or transmission ratio for the control characteristics of the individual wheel suspension according to the invention.

Furthermore, either flexible hose lines or preferably rigid pipes can be used in the hydraulic line system, wherein, in the case of pipes, flexible hose lines are provided, preferably so as to be as short as possible, at the corresponding movable transition points. For the sake of clarity of the disclosure of the invention, this is not shown specifically in the illustrations. In a particularly advantageous manner, the rolling and camber cylinders, and also diverse nonreturn valves and optionally flow restrictors, can be combined in a block, wherein line connections can be very substantially dispensed with (not illustrated).

In a preferred embodiment, the individual wheel suspension according to the invention is used in a motor vehicle.

LIST OF REFERENCE NUMBERS 1 individual wheel suspension
2 vehicle body
3 left wheel/rim arrangement
4 right wheel/rim arrangement
5 left wheel carrier
6 right wheel carrier
7 left upper transverse link
8 right upper transverse link
9 left lower transverse link
10 right lower transverse link
11 actuating means, camber cylinder
12 cylinder housing of 11
13 left piston rod of 11
14 right piston rod of 11
15 left lower articulation point between 9 and 2
16 right lower articulation point between 10 and 2
17 left upper articulation point between 7 and 2
18 right upper articulation point between 8 and 2
19 left elastic spring element, helical spring
20 right elastic spring element, helical spring
21 left detecting means, left rolling cylinder
22 right detecting means, right rolling cylinder
23 piston rod of 21
24 piston rod of 22
25 first hydraulic line
26 second hydraulic line
27 cornering force at 3
28 cornering force at 4
29 rolling moment
30 direction of movement of 13, 14

The invention claimed is:

1. An individual wheel suspension for a vehicle, the suspension comprising:
a plurality of wheel suspension parts coupling a vehicle wheel to a body of the vehicle;
detecting means including a single-acting piston-cylinder arrangement, for detecting relative movement between the body and the wheel suspension parts; and
actuating means structured to adjust a camber of the vehicle wheel using energy received directly from the single-acting piston-cylinder arrangement,
wherein the plurality of wheel suspension parts comprises an upper transverse link coupling the vehicle wheel to the vehicle body, and a lower transverse link coupling the vehicle wheel to the actuating means, and wherein the wheel suspension further comprises an elastic spring operatively coupling the upper link to the single-acting piston-cylinder arrangement.

2. The individual wheel suspension as claimed in claim 1, wherein the energy used by the actuating means to adjust the camber of the vehicle wheel is received exclusively from the single-acting piston-cylinder arrangement.

3. The individual wheel suspension as claimed in claim 1, wherein the energy used by the actuating means to adjust the camber of the vehicle wheel is generated exclusively by a rolling movement of the vehicle body.

4. The individual wheel suspension as claimed in claim 1 wherein the energy used by the actuating means to adjust a camber of the vehicle wheel is generated exclusively by a movement of a piston, of the piston-cylinder arrangement within a cylinder of the piston-cylinder arrangement.

5. The individual wheel suspension as claimed in claim 4 wherein the actuating means is structured such that a magnitude of the camber adjustment made by the actuating means is proportional to an amount by which the piston of the piston-cylinder arrangement moves within the cylinder of the piston-cylinder arrangement.

6. The individual wheel suspension as claimed in claim 4 wherein the movement of the piston within the cylinder is responsive to a rolling movement of the vehicle body.

7. The individual wheel suspension as claimed in claim 1 wherein the energy used by the actuating means to adjust a camber of the vehicle wheel is applied through the lower transverse link.

8. An individual wheel suspension for a vehicle, the suspension comprising:
an upper link coupling a vehicle wheel to a body of the vehicle;
a lower link coupling the vehicle wheel to the body of the vehicle;
detecting means including a single acting piston-cylinder arrangement, for detecting relative movement between the body and the upper link;
actuating means in fluid communication with the detecting means and structured to adjust a camber of the vehicle wheel responsive to a relative movement detected by the detecting means; and
an elastic spring element connecting the upper link to the detecting means.

9. The individual wheel suspension as claimed in claim 8 wherein the actuating means is structured to adjust a camber of the vehicle wheel by exerting a force on the lower link responsive to the relative movement detected by the detecting means.

10. The individual wheel suspension as claimed in claim 8 wherein the actuating means is structured to adjust a camber of the vehicle wheel by exerting a force on the lower link responsive to the relative movement detected by the detecting means.

11. A suspension system for a vehicle, the system comprising:
   first and second vehicle wheels coupled to a body of the vehicle;
   first detecting means for detecting relative movement between the vehicle body and the first wheel;
   second detecting means for detecting relative movement between the vehicle body and the second wheel; and
   a single passive, hydraulic double-acting piston-cylinder operatively coupled to the first and second vehicle wheels for adjusting a camber of both of the vehicle wheels responsive to a relative movement detected by at least one of the first and second detecting means,
   wherein each of the first and second wheels is coupled to the vehicle body by an upper link and a lower link, wherein the upper link coupling the first wheel to the body is connected to the first detecting means by first spring, and wherein the upper link coupling the second wheel to the body is connected to the second detecting means by a second spring.

12. The individual wheel suspension as claimed in claim 11 wherein the system is structured such that a hydraulic fluid is transferable from one of the first and second detecting means to the double-acting piston-cylinder arrangement, and from the double-acting piston-cylinder arrangement to the other one of the first and second detecting means.

13. The individual wheel suspension as claimed in claim 11 wherein the first detecting means is fluidly coupled only to a first side of a piston of the double-acting piston-cylinder, and wherein the second detecting means is fluidly coupled only to a second side of the piston opposite the first side.

* * * * *